United States Patent
Völkl et al.

(10) Patent No.: US 9,888,695 B2
(45) Date of Patent: Feb. 13, 2018

(54) MACHINE AND METHOD FOR PRODUCING SPIRAL SAUSAGES

(71) Applicant: TVI Entwicklung & Produktion GmbH, Irschenberg (DE)

(72) Inventors: Thomas Völkl, Bruckmühl (DE); Max Stacheder, Bruckmühl (DE)

(73) Assignee: TVI ENTWICKLUNG & PRODUKTION GMBH, Irschenberg (DE)

( * ) Notice: Subject to any disclaimer, the term of this patent is extended or adjusted under 35 U.S.C. 154(b) by 0 days.

(21) Appl. No.: 15/582,085

(22) Filed: Apr. 28, 2017

(65) Prior Publication Data
US 2017/0311613 A1 Nov. 2, 2017

(30) Foreign Application Priority Data
Apr. 28, 2016 (DE) .......................... 10 2016 107 854

(51) Int. Cl.
| | | |
|---|---|---|
| A22C 11/00 | (2006.01) | |
| A22C 11/02 | (2006.01) | |
| A22C 7/00 | (2006.01) | |
| B26D 3/11 | (2006.01) | |

(52) U.S. Cl.
CPC .............. *A22C 11/02* (2013.01); *A22C 7/003* (2013.01); *B26D 3/11* (2013.01); *A22C 7/00* (2013.01); *A22C 11/00* (2013.01)

(58) Field of Classification Search
CPC ....... A22C 11/00; A22C 11/001; A22C 11/02; A22C 11/0218
USPC ........... 452/21–26, 30–33, 35–37, 46–48, 51
See application file for complete search history.

(56) References Cited

U.S. PATENT DOCUMENTS

| | | | | |
|---|---|---|---|---|
| 4,429,435 A | * | 2/1984 | Walls .................... | A22C 17/006 99/419 |
| 4,589,333 A | * | 5/1986 | Murphy .............. | A47J 37/0688 99/419 |
| 4,625,634 A | * | 12/1986 | Kruper .................. | A47J 37/049 99/402 |
| 5,100,366 A | * | 3/1992 | Castens ................ | A22C 17/006 452/198 |
| 6,861,084 B2 | * | 3/2005 | Fallowes ............... | A47J 37/044 426/466 |
| D582,628 S | * | 12/2008 | Mammana ..................... | D1/102 |

FOREIGN PATENT DOCUMENTS

| | | |
|---|---|---|
| DE | 9105242 U1 | 12/1992 |
| DE | 10233068 A1 | 2/2004 |

* cited by examiner

*Primary Examiner* — Richard Price, Jr.
(74) *Attorney, Agent, or Firm* — Husch Blackwell LLP

(57) ABSTRACT

A device for making sausage spirals including a sausage blank attached with an end portion above a face of a vertically standing hub and wound into a sausage spiral by rotating it about the hub axis. The hub moves along a circumference of the rotating table wherein the following components are arranged behind one another along the circumference: an insertion station for the blank, a skewering station for skewering the finished sausage spiral and an ejection station for ejecting the sausage spiral from the machine.

19 Claims, 7 Drawing Sheets

MACHINE AND METHOD FOR PRODUCING SPIRAL SAUSAGES

CROSS-REFERENCE TO RELATED APPLICATIONS

This Application claims priority to German Patent Application Number 10 2016 107854.9 filed Apr. 28, 2016, to Thomas Völkl and Max Stacheder, currently pending, the entire disclosure of which is incorporated herein by reference.

FIELD OF THE INVENTION

The invention relates to a sausage spirals thus a sausage that is coiled into a spiral into one plane wherein the sausage is held together by a skewer inserted through the sausage in a radial direction in its main plane.

BACKGROUND OF THE INVENTION

Sausage spirals of this type are typically made by hand in that the sausage is rotated about a first end on a contact surface until the other end contacts an outer circumference of the proximal inner winding layer and then a skewer is manually inserted from the free outer end portion radially through a center of the sausage spiral and so that the skewer protrudes out of the opposite outer circumference.

For producing sausage spirals in large numbers this method on the one hand side is too expensive and yields sausage spirals which differ excessively in their optical appearance.

Thus it is appreciated that also of the sausage blank is one of the factors determining a uniform appearance of the finished sausage spiral.

SUMMARY OF THE INVENTION

Thus it is an object of the invention to provide a device and a method for producing sausage spirals in a time saving manner and with little manual effort and thus to obtain in particular a high level of uniformity with respect to dimensions and appearance of the sausage spirals produced.

With respect to the method the object is achieved by holding the strand shaped sausage blank at one end while the sausage blank rests on a contact surface and the held end is rotated about a winding axis extending orthogonal to the contact surface, in particular using an attachment device which holds the end of the blank at the hub. The contact surface thus advantageously does not co rotate with the winding axis.

Thus a stop at the outer circumference of the spiral being wound is held in contact and automatically adjusted to an increasing distance of the outer circumference from the winding axis of the spiral that is being produced in that the stop is spring preloaded in a direction of the winding axis. During the winding the winding axis can continue to move.

When the entire blank is wound into a spiral the spiral is skewered thus a skewer is pushed through the spiral approximately at half the height of the thickness of the spiral in the main plane of the spiral so that the skewer extends through the outer end portion of the spiral as well as through the inner end portion, thus advantageously approximately through the geometric center of the spiral. For this purpose the spiral is rotated far enough about the winding axis so that the non-co-rotating stop contacts the spiral shortly before the end of an outer most winding of the spiral.

Advantageously during skewering the skewer is always at the same starting position before it is pushed through the spiral and the spiral is moved together with the winding axis into a fitting position in front of the skewer.

Thus care is also taken that the skewer with its extension does not exactly point to the end portion of the outer most winding of the spiral but passes the stop, thus with minimum distance so that a portion of the outer winding that is to be skewered still contacts the next inner winding closely.

Thus it is advantageously also checked whether a spiral is provided at all on the hub contact surface when the hub contact surface is in front of the skewer thus at the skewering position.

Advantageously this is done in that a scanning surface is positioned at a distance from the spiral above and parallel to a contact surface arranged at this position, the skewering position wherein the contact surface is elevation adjustable by a suspension.

By pressing the contact surface up by a distance which is greater than the original distance between the scanning surface and the spiral but not greater than a sum of distance and thickness of the spiral this only yields a lifting movement of the scanning surface which is detected when a spiral has been on the contact surface.

The skewering is advantageously performed automatically and so that the skewer subsequently protrudes on both opposite outer surfaces of the spiral and also through an outer end portion and an inner end portion of the spiral which is respectively shorter than the twice the diameter of the blank, better shorter than 1.5 times the diameter of the blank.

Subsequently the finished and skewered spiral can be lifted up by the contact surface or lifted off the contact surface and respectively disengaged from the attachment device and handled further.

During winding the spiral that is being produced or which is already finished is rotated until the outer end of the spiral contacts at a circumference of the next inner layer of the spiral and the contacting end portion is arranged opposite to the skewer penetration position of the spiral.

Advantageously the spiral that is being produced and which rests on the contact surface during winding about the winding axis is held between the contact surface and a cover surface that extends parallel to the contact surface so that the spiral has little clearance from the cover surface or contacts the cover surface.

With respect to the machine the object is achieved in that the machine includes first of all a base frame in which a hub is supported so that it is drive able to rotate and a secondary axis that is oriented to the first axis and a contact surface that is aligned with an upward oriented face surface of the hub and extends about the hub and is aligned approximately horizontally.

A finite strand shape sausage blank can thus be attached with one of its end portions by an attachment device on the upward oriented face of the hub so that the rest of the blank protrudes in a radially outward direction from there and extends approximately radially over the contact surface but does not co-rotate with the hub when the hub rotates about the secondary axis, thus the winding axis. By rotating the hub with the end portion retained thereon a sausage spiral is wound from the strand shaped blank wherein the sausage spiral is arranged in approximately a horizontal plane.

The machine furthermore includes a skewering unit advantageously at a fixed position which facilitates inserting a typically wooden skewer through the completely wound sausage spiral in or parallel to the main plane of the sausage spiral.

The machine furthermore advantageously includes a cover plate which is offset above the contact surface which is typically the top side of a contact plate and arranged at a distance which coincides with or is slightly greater than the distance of the blanks to be processed.

The contact surface or the contact plate can be arranged so that it co-rotates with the hub or so that it is also stationery relative to the hub.

Furthermore the machine advantageously includes a stop element with a contact surface which is arranged offset from the secondary axis, the winding axis and which is advantageously arranged extending parallel thereto.

In an advantageous embodiment the machine does not only include one hub, but plural hubs and/or a transport device in which the at least one hub is moveable in a transport direction in particular along a guide, wherein the transport direction is perpendicular to the direction of the hub axis and advantageously arranged in a horizontal plane.

Advantageously a plurality of hubs with associated enveloping contact surfaces are automatically move able along the transport device, in particular moveable independently from each other or also connected with each other like a chain in the transport direction.

Advantageously the transport device is configured so that the transport movement of the hub automatically causes a rotation of the hub about the hub axis.

The transport direction can be a curved circumferentially direction, in particular a circular path in top view and/or the hubs moved by the transport device are connected by gears with the transport device which determine the transport direction, in particular the circumferential direction for a circular track shaped transport direction wherein the circumference of a rotating table determines the transport direction and the gears roll on the circumference. Advantageously the circumference of the rotating table includes teething which meshes with an external teething that is advantageously arranged on the circumference of the hub advantageously below the contact surface.

Instead of the teething also friction locked connections, thus friction rollers and friction surfaces are useable.

Rotating the rotating table thus facilitates putting all hubs arranged around the rotating table into rotation simultaneously and winding the blanks attached thereon into spirals.

The machine includes plural operating stations:

An insertion station for inserting and attaching an end portion of the blank at the attachment device of the hub A skewering station for automatically skewering the completely wound spiral with a skewer;

An injection station advantageously radially ejecting the finished skewered spiral on an extraction device, e.g. a conveyor belt.

Thus a blank can be attached with one end portion typically manually at each other hubs stopping at the insertion station or passing the insertion station at its attachment device and the subsequent movement of the hubs automatically winds the spiral until the skewering is performed at the skewering station after finishing the spiral and thereafter the ejection is performed at the ejection station wherein advantageously the contact surface which is a top side of a contact plate that extends about the hub and thus with the hub that it surrounds is moved along but does not co-rotate with the hub and is lifted above the upper end of the attachment device so that the spiral can then be pushed onto the extraction device in a radially outward direction by an ejector.

Namely advantageously the attachment device is made from two support pins which protrude upward from the face of the hub and which are evenly distributed about the hub axis, wherein this is advantageously an even number of support pins, advantageously four support pins or 6 support pins and a distance of the support pins is selected equal to or less than a thickness of the contact sausage blank is to be inserted from about between two adjacent pairs of support pins and which is held at this location with a preload due to a previous compressing by the operator.

The distance between the adjacent support pins between which the blank shall be inserted is 40% to 5%, better 30% to 10%, better 25% to 15% smaller than a thickness of the blank.

Advantageously the support pins are adjustable with their radial distance from the hub axis, in particular jointly adjustable.

The machine furthermore includes a contact surface which extends on a round table along a circular segment of the turn table, advantageously radially within the transport device along which the hubs move and which protrudes upward from the height of the contact surface at least over a distance which corresponds to the greatest distance of the blanks to be handled. In the transport direction however the distance of the contact surface to the hub axis increases however the contact surface is advantageously not rigidly mounted but moveable in the radial direction relative to the transport device and thus also the hub axles, in particular spring loaded and preloaded in a direction of the transport direction thus in a direction of the hubs transported thereon with their hub axles.

A cover plate is advantageously provided along a circular segment of round table of this type in top view above the movement path along which the contact surfaces move and thus at a vertical distance that is identical to or only slightly greater than a thickness of the blank to be processed in order to prevent that a winding moves out of the only desired winding plane and is displaced into a second winding plane that is offset from the intended winding plane.

Advantageously the cover plate starts downstream of the beginning of the stop element and/or terminates advantageously upstream of the end of the contact element.

Furthermore the machine includes a control which is configured to control all moveable portions of the machine and which is in particular configured to detect that the finished spiral is arranged in a rotation position relative to the machine and/or the winding axis of the hub so that the skewer can be inserted through the outer end portion of the spiral by the skewering unit advantageously arranged radially outside of the transport device for the hubs and thus also extends through the inner end portion of the skewer.

The end portion is thus a portion of 5 cm at the most, better only 3 cm, better only 2 cm from the end of the spiral, measured in the extension direction of the windings of the spiral, thus of the blank.

DESCRIPTION OF THE SEVERAL VIEWS OF THE DRAWING

In the following, an advantageous embodiment of the present invention will be explained in more detail making reference to the following drawings, in which the individual figures show.

DETAILED DESCRIPTION OF THE INVENTION

Figure 1A:
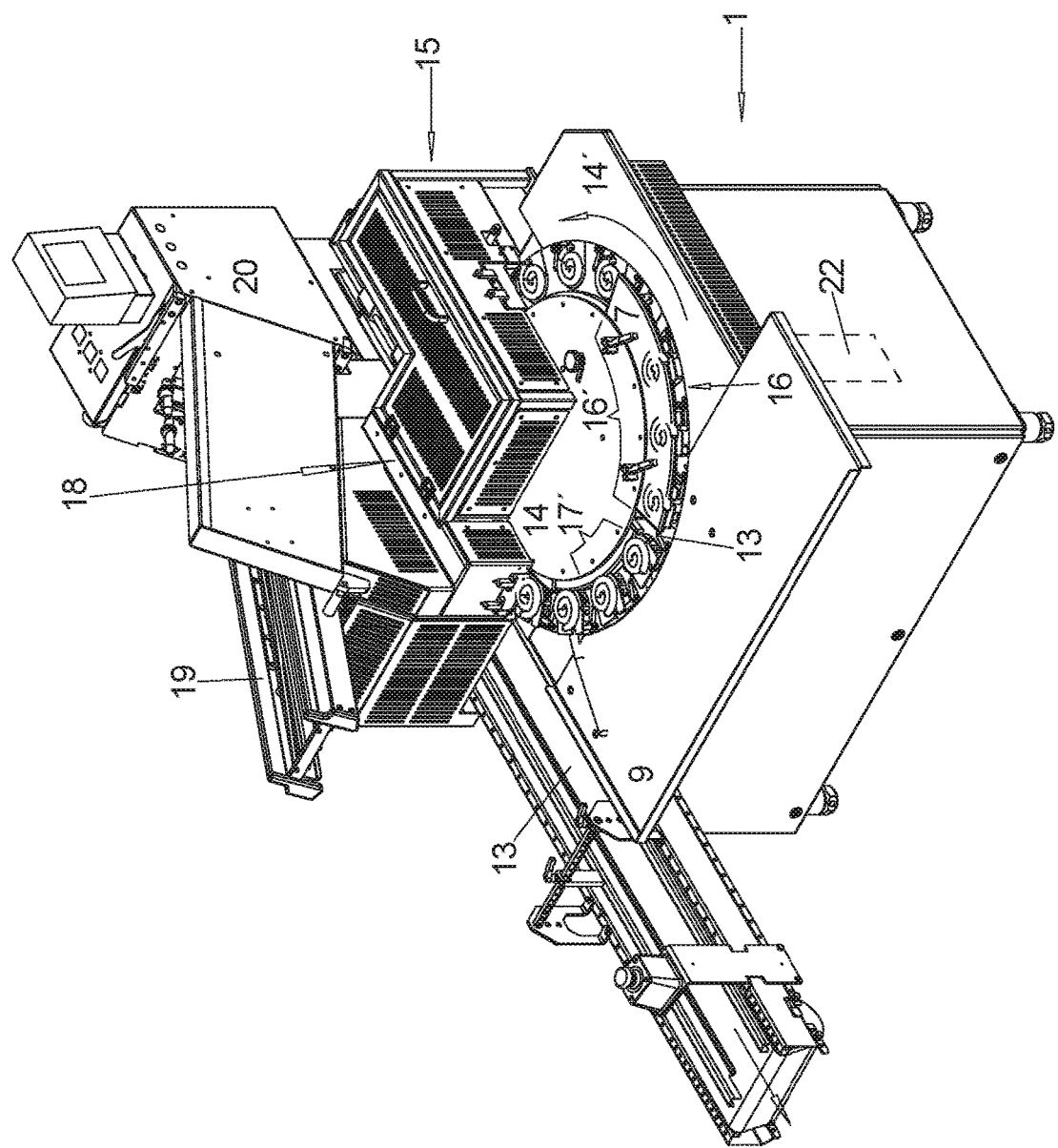
FIG. 1A illustrates the machine in a perspective view.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

Figure 2A:
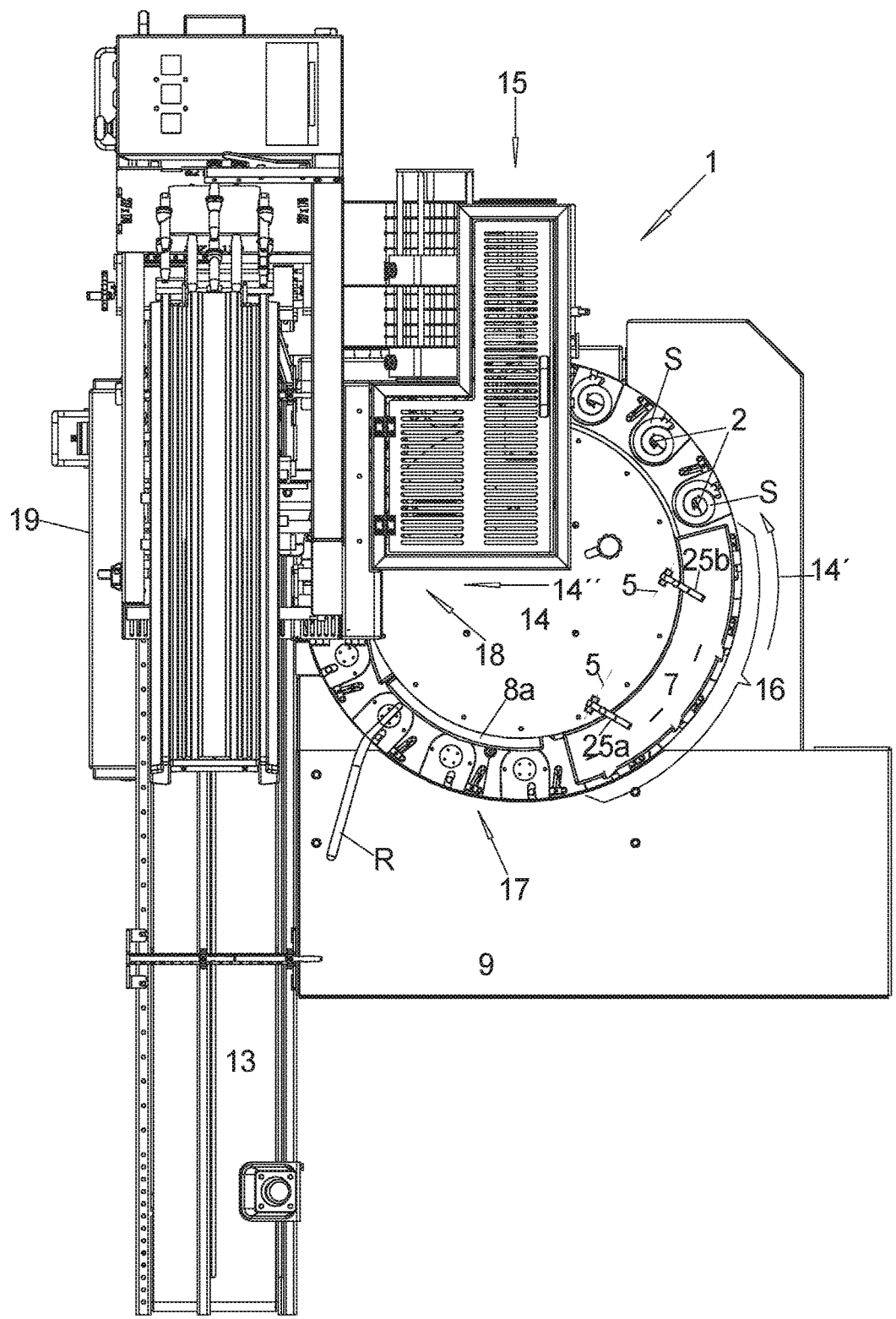
FIG. 2A illustrates the machine in a top view from above.
Figure 2B:
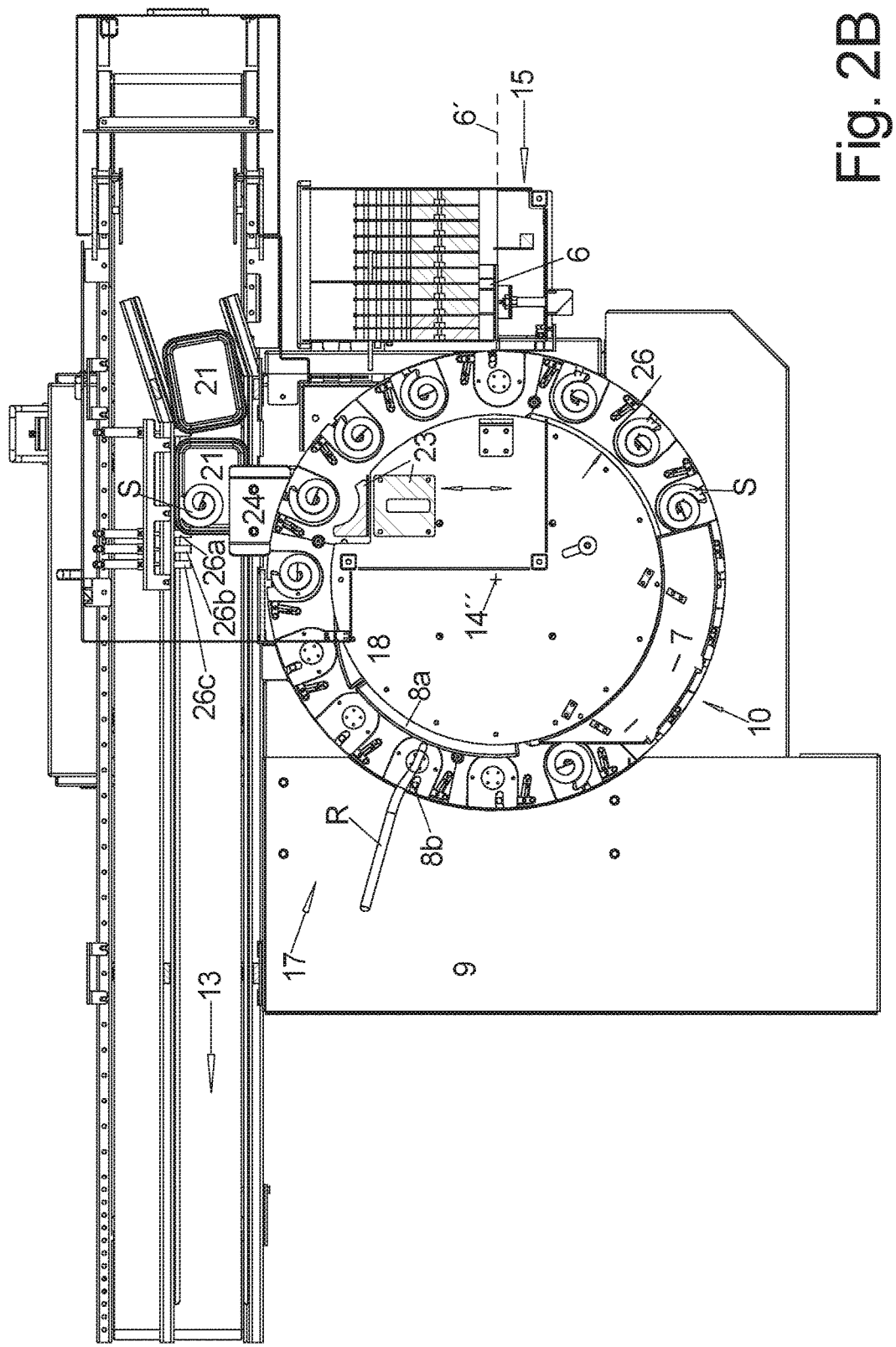
FIG. 2B illustrates the machine in the top view from above, wherein the super structures above the round table and of the hubs and contact surfaces arranged thereabout are removed.

FIGS. 1A, 2A, and 2B illustrate the round table 14 with its horizontally arranged top side and with its circular outer circumference about whose outer circumference a plurality of hubs 2 are arranged which are drive able to rotate about a vertical hub axis 2' the winding axis of each hub 2 so that faces 2a, of the hubs are oriented upward.

Figure 3:
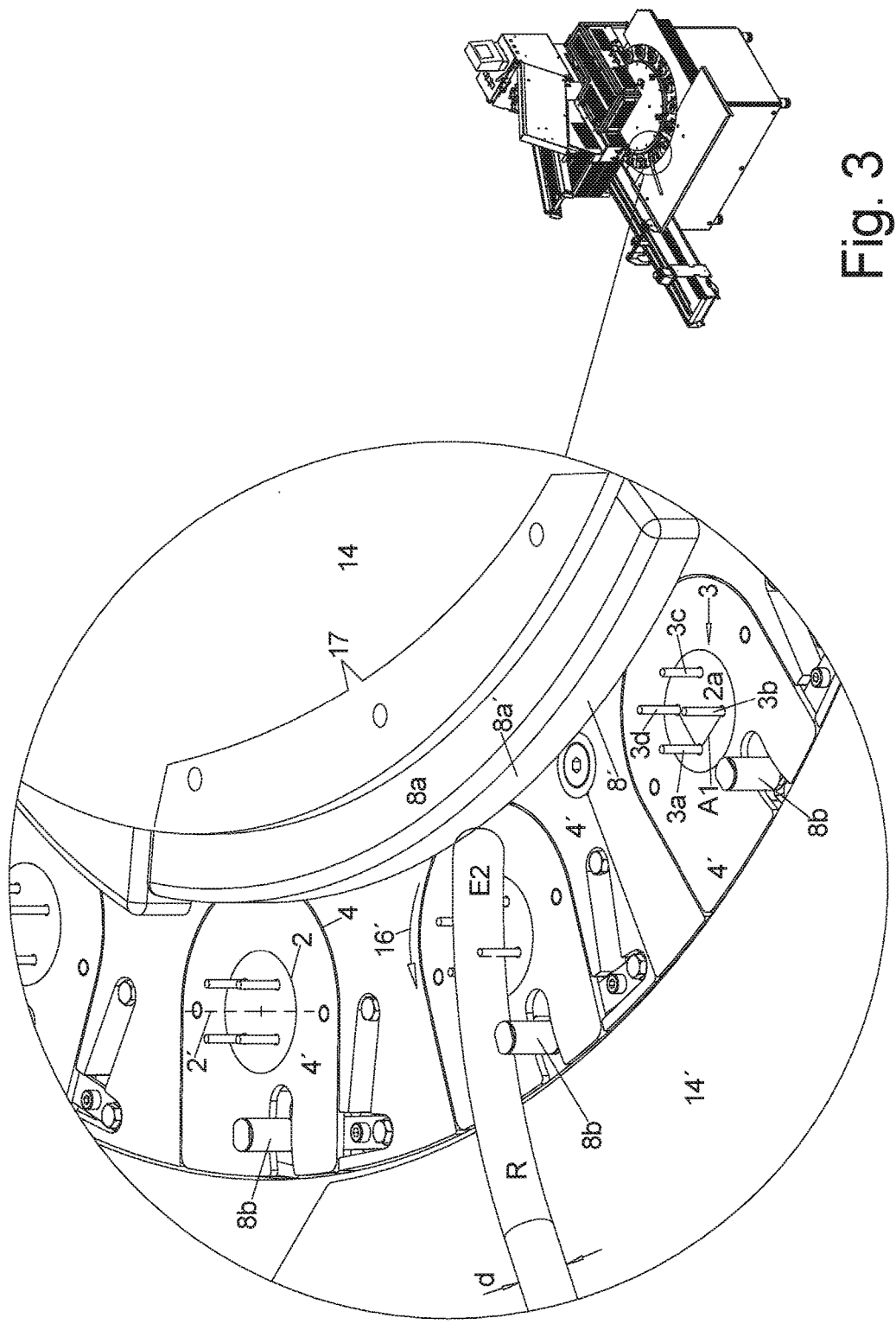
FIG. 3 illustrates an insertion station in an expanded view.

As evident from FIG. 3 the face 2a of each hub 2 is enveloped by a contact surface 4', the top side of the contact plate 4 that is aligned with the face 2a, thus arranged at the same level and also oriented horizontal, wherein a diameter of the contact plate is greater than a diameter of the finished spiral S.

Each hub 2 with circumferential contact surface 4 is moved along the circumferential direction 14', thus the transport direction 12' by a transport device 12 in increments about the round table 14 in a circular path, wherein the contact plate 4 does not rotate or pivot together with the hub 2 about the vertical hub axis 2' or another vertical axis but stands still relative to the hub axis 2'.

The individual hubs 2 and the surrounding contact plates 4 are connected with one another in the circumferential direction 14', advantageously either concatenated and advantageously held at a uniform distance in the circumferential direction 14 and are advantageously run in a circular path along an invisible guide which is concentrically arranged about the round table axis 14" and which is also vertically arranged, or arranged on an outer circumference of a hub carrier that is drive able to rotate about the round table axis 14". Thus this is a closed loop which is not completely visible due to the machine modules arranged there above.

The round table 14 and the transport device 12 by which the hubs 2 are transported in the transport direction 12 the circular circumferential direction 14' are arranged at a base frame 1 of the machine.

It is visible in FIGS. 2A and 2B that plural operating stations are provided in the circumferential direction 14' in top view in this case counter clockwise behind one another, namely the insertion station 17, the winding station 16, the skewering station 15 and the ejection station 18 provided in FIGS. 2A and 2B at the left corner.

Producing the sausage spirals S proceeds as follows, wherein the hubs 2 are advantageously cycled and not permanently moved in the circumferential direction 14'.

In a portion, thus a segment of the outer circumference 14 of the insertion station 17 an operator attaches an end portion E2 of each strand shaped blank R at the attachment device 3 on the face 2a of a hub 2 on a face of each hub 2 transported past the operator as evident from FIG. 3 so that a leftover of the strand shaped blank R radially extends over the enveloping contact surface and contacts the enveloping contact surface.

In order to prevent injuries the attachment device 3 is only attached torque proof at the hub 2 with a maximum retaining force, in particular in that both components are respectively configured with one of two magnets that adhere to one another torque proof and when exceeding the retaining force of the two magnets at each other the operating connection between the intermediary hub 2 and the attachment device 3 is disengaged.

In the portion of the insertion station 17 at a distance there from and concentric to the outer circumference of the round table 14 an operating plate 9 is arranged which extends at one level with and in alignment with the round table 14 so that a transport channel 26 is arranged there between along which the contact plates 4 are moved with a respective hub 2 rotate ably arranged therein.

In the portion of the insertion station 17 furthermore a contact surface 8'a of a first contact element 8a is provided along the outer circumference of the round table 14 and upward protruding from the level of the contact surface 4' wherein the contact surface is used as a stop for the operator which determines how far the operator can insert the strand shaped blank R that is moved in from the radial outside beyond the face 2a of the hub 2 in a radially inward direction towards a center of the base table 14 during insertion.

As evident from FIG. 3 four support pins 3a-d are provided as an attachment device on the face 2a of a hub 2 about a hub axle 2' evenly distributed an offset therefrom wherein the support pins extend vertically upward from the face 2a and whose mutual distance A1 is greater than a thickness d of the sausage blank so that the inserter who wants to insert an end portion of the blank advantageously between two offset pins of the support pins thus exactly radially extending has to compress this end portion before in order to then insert it from above between the freely upward extending support pins and press it in there between.

In a circumferential direction 14' at an end of the insertion station 17 which extends over an insertion segment 17' of the round table 14 advantageously also the first radially inner stop 8a terminates which is illustrated concentrically extending about the center axis 14" of the round table 14.

Through further transporting in the transport direction 12', the circumferential direction 14' the hubs 2 with the blanks are attached there to and respectively with the contact surface 4' enveloping the hub 2 move into the portion of the winding station 14 which also defines a particular segment about the round table 14.

The hubs 2 rotate about its hub axis 2', the winding axis initially in the portion of the winding station 16 always when they are moved further in the circumferential direction 14 by a transport device 12.

Figure 4:
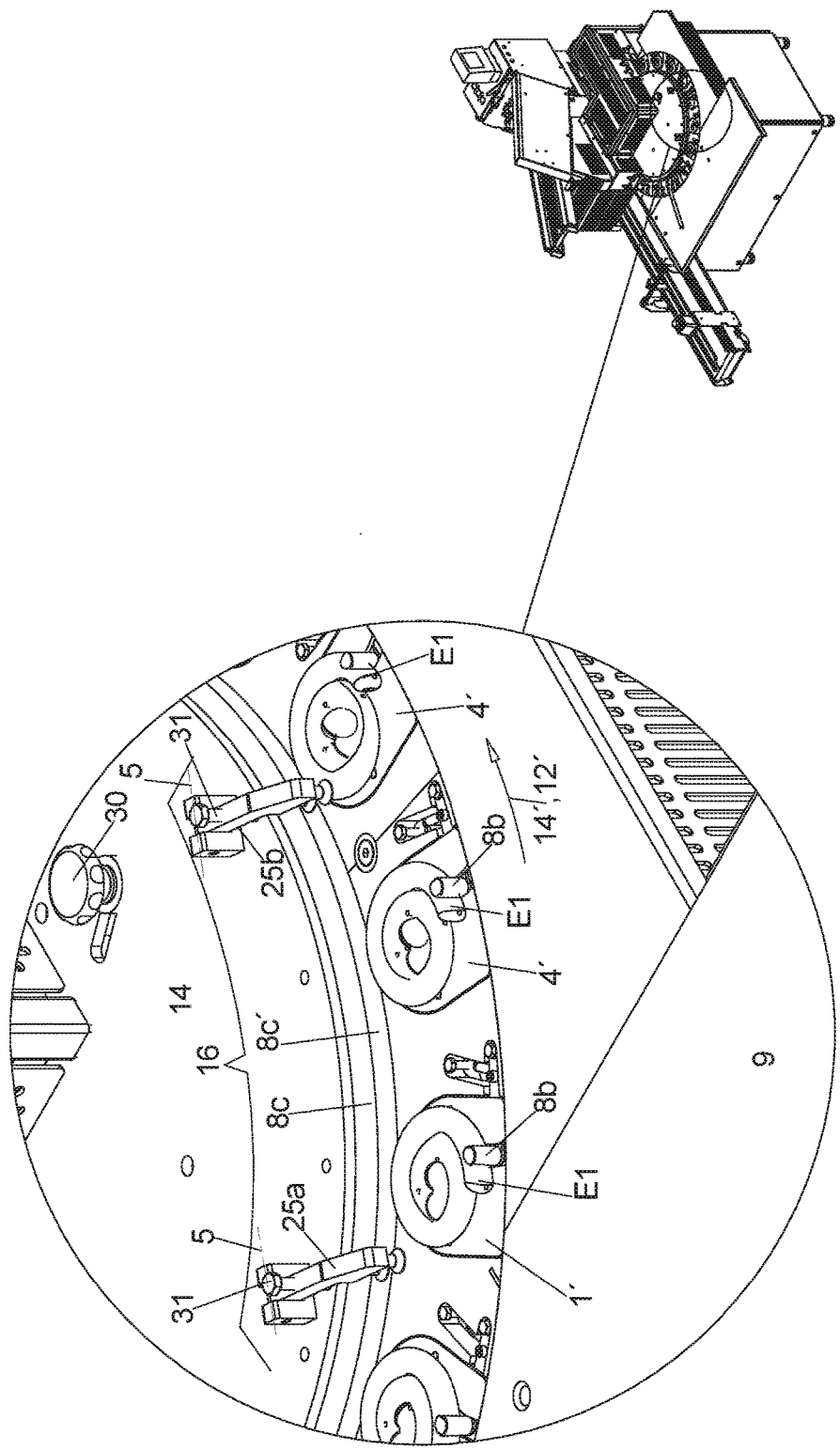
FIG. 4 illustrates the winding station in the top view.

Before that the hubs 2 advantageously cannot have rotated since the rotation drives for the hubs 2 only starts at an end of the insertion portion 17 and at a beginning of the winding station 16 that is illustrated in FIG. 4.

Figure 1B:
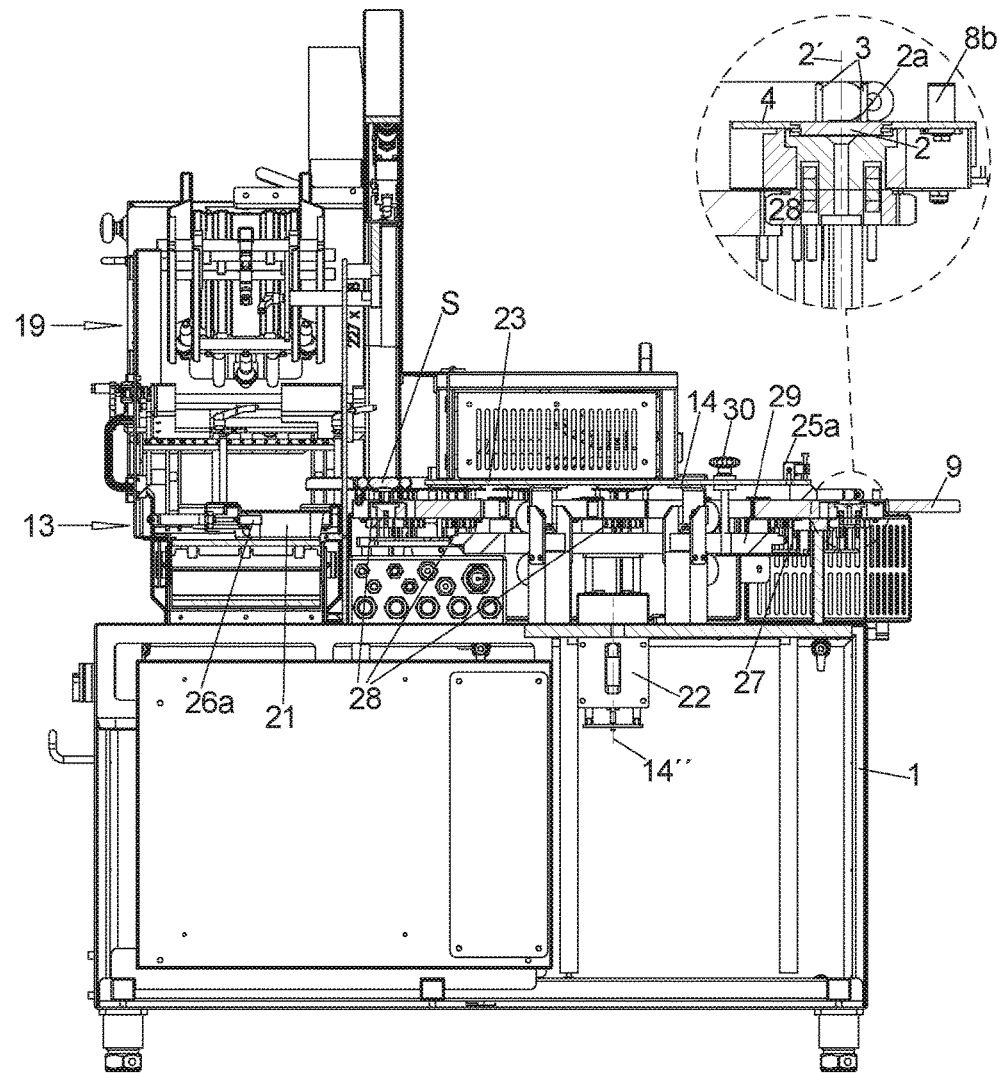
FIG. 1B illustrates a machine in a front view, thus of FIG. 1A from a left lower corner of the depiction.

As illustrated in FIG. 1B the rotation drive for the hubs 2 can be provided in a very simple manner in that a circumferential teething provided as an arcuate gear rack 27 is applied at the outer circumference of the round table 14 in the portion of the winding station 16 and below the level of its surface, thus the level of the contact surfaces 14' and by the same token the hubs 2a include a teething provided as a sprocket 28 below their face at an outer circumference which teething is connected with the hub torque proof and adapted to the gear rack 27 extending concentric to the hub axis 2' and meshing with the gear rack 27, wherein the teething meshes with the gear rack 27 on a circumference of the round table 14.

As soon as the hubs 2 are moved forward in the circumferential direction 14' by transport drive 22 the sprockets 28 of the hubs 2 roll on the gear rack 27 of the stationary round table 14 and thus rotate during further movement in particular incrementally about their own hub axis 2' and the spiral S starts to be produced.

Thus a second contact element 8b is provided eccentrical to the hub axis 2', advantageously slightly preceding the hub axis 2' wherein the second stop element protrudes upward from the contact surface 4' and is provided as an upward protruding contact pin wherein the contact element advantageously protrudes in upward direction from a slot opening on an outside of the contact plate 4 and wherein the contact element is preloaded spring elastic in a direction of the center portion of the contact plate 4.

Thus, the pin presses the outer most winding, thus layer of the spiral that is being made in a direction of the hub 2 and in particular in a direction of the secondary axis 2' and thus prevents a winding of the spiral S that is too loose.

As evident in FIGS. 1A and 1B, a cover plate 7 is supported at the cover holders 25a, b over the winding portion 16' of the winding station 16 in top view above the transport channel 26 and at a distance above the contact surfaces 4' wherein the cover plate is arranged slightly above the forming spiral S and contacts the spiral S with its bottom side and prevents that a winding of the spiral S does not remain in the spiral plane S'. Therefore the distance A2 is identical to or only slightly larger than the thickness d of the blank R and certainly adjustable.

Advantageously the cover plate 7 is simply placed with its intrinsic weight onto the top side of the spirals that are being made in that the cover holders 25a, b are attached pivot able about a horizontal pivot axis 5 at their rear end on the top side of the round table 14 while they hold the cover plate 7 on its top side with their free end.

For reasons of clarity this cover plate 7 is omitted in the enlarged illustration of FIG. 4 for the winding station 16 so that it is visible that in this portion a third stop element 8c with a stop surface 8'c is provided on an inside of the transport channel 26, wherein the inside of the transport channel extends along the outer circumference of the round table 14 and extends vertically upward.

In top view the arcuate chambered contact surface 8c does not extend concentric to the center of the round table 14 but with a slightly decreasing distance from the table center 14" in the transport direction 12', the circumferential direction 14'.

At an end of the winding station 16 or at a beginning of the skewering station 15 following in the circumferential direction 14' it is being checked for example by an optical or mechanical detection device whether the second stop element 8b is protruding from the contact surface 4' on an outside of the transport channel 26 contacts the outer most layer of the Spiral S, thus the outer most winding shortly before its outermost end portion E1.

As soon as this is the case the free—wheeling connection of the respective hub 2 is activated, thus either the hub 2 is decoupled from the sprocket arranged about the hub axis 2' or the sprocket is decoupled in another manner from the gear rack.

Another option is that the gear rack that is cambered in top view is configured in two pieces with a gap approximately at the transition from the winding station 16 to the skewering station, wherein the subsequent rod portion in transport direction 12 is pivot able about a vertical pivot axis at the rear end that is adjacent to the first rod portion. The more the other free end of the second rod portion is pivoted radially inward in a direction towards the table center 14" by a controlled lever, the earlier the sprocket of the hub 2 moving in the circumferential direction is taken out of engagement.

Figure 5:
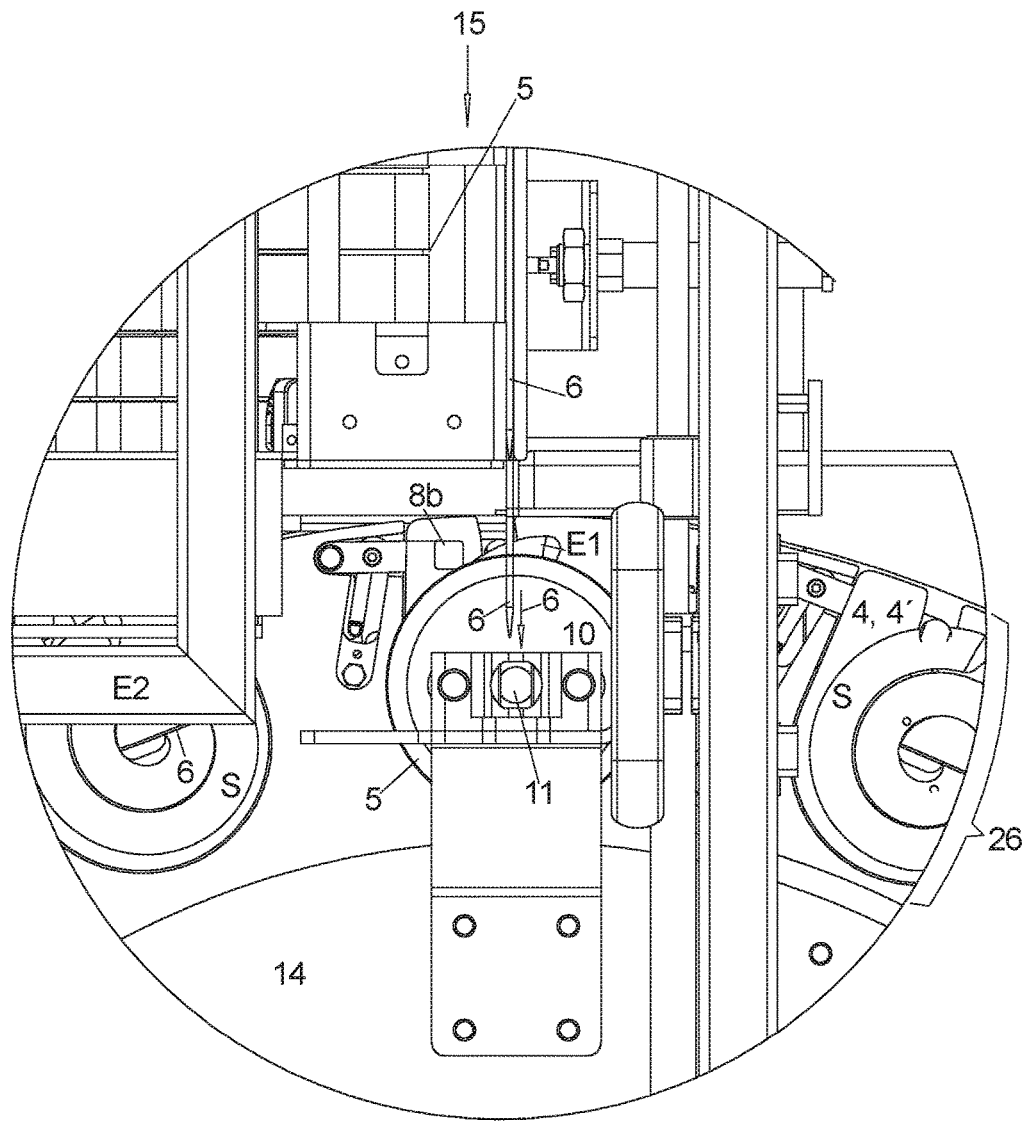
FIG. 5 illustrates the skewering station in a blown up top view.

Thus, during further transport in the transport direction 12' the circumferential direction 14' the hub 2 does not rotate any further and this condition is maintained until the hub 2 is at a defined skewering position 15' in the skewering station 15 through further transportation which is illustrated in FIG. 5 in a blown up top view.

Thus, it is easily visible that the radially outer inward spring loaded second stop 8b contacts at an outer end portion E1 of the spiral but at a point so that a distance remaining to the absolute outer end of the spiral suffices to insert a skewer 6 from a radial outside in a direction towards a center of the round table 14 without colliding with the radially outer stop element 8b configured as an upward protruding pinion.

In this position it is also assured that the skewer 6 which is arranged at a radially outside with respect to the transport channel 26 and which automatically inserts the skewer 6 is arranged approximately at half the height of the thickness d of the spiral S contacts on the one hand side also the inner end portion E2 of the spiral S and on the other hand side does not collide with the support pins 3a, d, but the skewer 6 extends through pairs of the support pins 3a, b and 3c, d that are offset from each other until the skewer exits again from an opposite outer circumference of the spiral S.

This can be achieved in that winding the spiral S is only completed in a rotation position of the hub 2 about the winding axis 2' so that a sufficiently wide channel is provided between the support pins wherein the channel is provided in the skewering direction 6', the movement direction of the skewering in which the skewer is also moved during skewering.

FIG. 5 furthermore illustrates the detector plate arranged above the spiral S wherein the detector plate substantially covers the surface of the spiral S and which is coupled with a lift sensor 11 arranged there above.

Furthermore a non-illustrated lifting device is covered in the skewering station 15 at the skewering position below the contact plate 4 where the spiral S contacts, wherein the lifting device is configured to lift the contact plate 4 by a defined distance which suffices to lift the detector plate 10 using the spiral S which is typically arranged there between which is in turn detected by the lift sensor 11.

When this lifting of the detector plate 10 does not occur and the lift sensor 11 does not deliver a signal no skewering is performed since no signal means that there was no spiral S on the contact plate 4.

This is considered in that the cycle time for the transport device 12 can be set fast enough so that an operator manages in most cases but not in all cases to insert a blank R into the insertion portion of each hub 2, thus its attachment device 3.

The skewering can be performed in that lifted position of the contact plate 4 or in the lowered position of the contact plate 4, wherein the skewer 6 in the skewering station 15 has to run at a level that is suitable for skewering the spiral S.

The hub 2 and the contact surface 4' is transported onward with the spiral S placed thereon that is skewered now and wherein the transporting is performed by the transport device 12 as best evident in FIG. 2B.

Thus the finished an skewered spiral S is lifted by the lifting device also provided at this location which is configured to lift the contact plate 4 wherein the lifting is performed beyond the upper end of the support pins 3a-d and the spiral is pushed by an ejector 23 radially outward onto a downward slanted slide 24 from where the skewer falls over the end of the slide 24 into a dish 21 exactly positioned there under.

The dishes 21 are nested into each other and with a downward slanted stacking direction placed onto a slanted storage surface and individually separated from the stack by an individualizer 19 and individually placed on the extraction conveyor 13, a conveyor belt in its running direction behind one another.

The spirals S shall be advantageously placed in the dish 21 stacked on top of each other like shingles and thus partially overlapping.

For this purpose a first dish 21 is stopped at one of plural stoppers 26a, b, c protruding into the movement path of the dishes 21 in a position so that the next spiral S dropping off from the slide 24 hits in the desired first position defined by the first stopper 26a in the dish 21.

Thereafter the first stopper 26a is removed from the movement path of the dish, thus transversal to the transport direction of the extraction conveyor so that the dish 21 moves forward to the next stopper 26b in the movement path which corresponds to the second position for the next spiral S to be dropped off.

In the illustrated case this repeats again with the lasts stopper 26c in this case since depositing three spirals S in a dish 21 is provided.

After pulling back the last stopper 26c the dish 21 leaves the machine along the extraction conveyor 13 but immediately after passing the end of the dish 21 the first stopper 26a deploys again into the activated position in the movement path of the dishes and stops the subsequent next empty dish 21 in this first position for filling.

This way with an operator at the single insertion station 17 and optionally a second operator at the at the ejection station 18 a multiple amount of sausage spirals can be produced per unit time compared to manual production.

The blanks R are typically provided to an operator at the insertion station 17 in a box.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

The invention claimed is:

1. A machine for producing sausage spirals from a finite sausage blank, the machine comprising:
   a hub that is drivable to rotate upon a hub axis of rotation and includes a centrally arranged attachment device on a face for the sausage blank and the sausage spiral generated therefrom wherein the face that is arranged orthogonal to the hub axis of rotation,
   a skewering unit for automatically inserting a skewer through the sausage spiral.

2. The machine according to claim 1, wherein the hub axis of rotation is arranged vertically.

3. The machine according to claim 1, wherein a transport device drives the at least one hub in a transport direction that extends substantially transverse to the direction of the hub axis of rotation.

4. The machine according to claim 3, wherein the transport direction is curve linear.

5. The machine according to claim 1, wherein the hub is coupled to its rotation drive by a free-wheeling device.

6. The machine according to claim 1, wherein the machine includes a control which is configured to detect that a finished skewer is in a rotation position so that an insertion direction of the skewer to be inserted extends through an outer end portion of the sausage spiral.

7. The machine according to claim 1, further comprising:
   an insertion station for inserting the blank into the attachment device;
   a winding station for winding the sausage spiral;
   a skewering station for skewering the sausage spiral; and
   an ejection station for ejecting the sausage spiral on an extraction conveyor.

8. The machine according to claim 1, wherein a contact surface is provided about the face.

9. The machine according to claim 8, wherein a cover plate is provided offset from the contact surface at a distance that is equal to or slightly greater than a thickness of the blank.

10. The machine according to claim 9, wherein the cover plate starts in a circumferential direction downstream of a first stop element and terminates advantageously upstream of an end of the first stop element.

11. The machine according to claim 8, wherein a second contact surface is arranged vertically and offset from the hub axis of rotation and extends parallel to the hub axis of rotation.

12. The machine according to claim 11, wherein a third contact surface extends over a circular segment of a round table along a circumference of the round table.

13. The machine according to claim 12, wherein the upper cover plate extends over a different circular segment of the round table.

14. The machine according to claim 8, wherein the attachment device comprises at least four support pins that are eccentrically offset about the hub axis of rotation and uniformly offset from each other, wherein the support pins protrude parallel to the hub axis of rotation and orthogonal to the contact surface with a distance from each other that is less than a thickness or diameter of the sausage blank.

15. The machine according to claim 14, wherein the distance of the support pins from each other is between 40% and 5% less than the thickness or diameter of the sausage blank.

16. The machine according to claim 8, further comprising a plurality of hubs, each hub having a contact surface moveable along the transport device and independently from the other of said plurality of hubs.

17. A method for producing a sausage spiral from a sausage blank, the method comprising the steps of:
fixing the sausage blank at a first end of the sausage blank,
rotating the sausage blank on a contact plate about an axis substantially orthogonal to a contact surface of the contact plate to create the sausage spiral, wherein a spot at an outer circumference of the sausage blank is supported at the contact surface having an increasing distance from the hub during winding,
skewering the sausage spiral parallel to its main plane and through its center, and
removing the sausage spiral from the attachment device.

18. The method according to claim 17, further comprising the step of rotating the sausage spiral until a second end of the sausage blank contacts a circumference of the preceding layer of the sausage spiral and an end portion of the sausage spiral is arranged opposite to a skewering position of the sausage spiral.

19. The method according to claim 17, further comprising supporting the sausage spiral during rotating with or without clearance between the contact surface and a cover surface.

* * * * *